United States Patent
Park et al.

(10) Patent No.: US 11,615,658 B2
(45) Date of Patent: Mar. 28, 2023

(54) VEHICLE FUEL TANK MODELING SYSTEMS AND METHODS

(71) Applicant: Ford Global Technologies, LLC, Dearborn, MI (US)

(72) Inventors: Hyongju Park, Ann Arbor, MI (US); Ben Bulat, Northville, MI (US); Richard Gordon, Canton, MI (US); Arnold Babila, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 17/037,829

(22) Filed: Sep. 30, 2020

(65) Prior Publication Data
US 2022/0101665 A1    Mar. 31, 2022

(51) Int. Cl.
*G07C 5/08* (2006.01)
*B60K 15/03* (2006.01)
*G07C 5/00* (2006.01)

(52) U.S. Cl.
CPC ............ *G07C 5/0816* (2013.01); *B60K 15/03* (2013.01); *G07C 5/008* (2013.01); *B60K 2015/03217* (2013.01); *B60K 2015/03473* (2013.01)

(58) Field of Classification Search
CPC ...... G07C 5/0816; G07C 5/008; B60K 15/03; B60K 2015/03217; B60K 2015/03473
USPC ....................................................... 701/29.6
See application file for complete search history.

(56) References Cited

U.S. PATENT DOCUMENTS

| | | | | |
|---|---|---|---|---|
| 4,724,705 A * | 2/1988 | Harris | ...................... | G01F 23/68 338/33 |
| 4,918,619 A * | 4/1990 | Orloff | ................... | G01F 23/263 73/304 C |
| 5,158,362 A * | 10/1992 | Brauer | ................... | B64G 1/402 73/167 |
| 6,594,579 B1 * | 7/2003 | Lowrey | .................... | G08G 1/20 340/439 |
| 6,597,998 B1 * | 7/2003 | Gonring | .................. | G01F 25/20 73/1.73 |
| 6,615,656 B1 * | 9/2003 | Breed | ...................... | G01F 23/36 177/136 |

(Continued)

FOREIGN PATENT DOCUMENTS

DE    102009007532 A1    8/2010
JP      2011141161 A       7/2011

OTHER PUBLICATIONS

Eskilsson et al., "Fuel Level Estimation Methods—Master's thesis in Systems, Control and Mechatronics", Department of Electrical Engineering, Chalmers University of Technology, Gothenburg, Sweden 2018 (67 pages).

*Primary Examiner* — Logan M Kraft
*Assistant Examiner* — John D Bailey
(74) *Attorney, Agent, or Firm* — Brandon Hicks; Eversheds Sutherland (US) LLP

(57) ABSTRACT

Vehicle fuel tank modeling systems and methods are provided herein. An example method includes introducing known volumes of fuel into the fuel tank, determining correlations of fuel level percentage values relative to the known volumes of fuel placed into the fuel tank, offsetting the correlations to compensate for unusable fuel volume of the fuel tank, selecting a non-linear fuel tank model that fits the offset correlations, and applying the non-linear fuel tank model to a target vehicle having a fuel tank with a fuel tank part number.

20 Claims, 6 Drawing Sheets

(56) References Cited

U.S. PATENT DOCUMENTS

| | | | |
|---|---|---|---|
| 6,907,371 B2* | 6/2005 | Klinger | B60R 16/0232 702/100 |
| 7,103,460 B1* | 9/2006 | Breed | G07C 5/008 706/15 |
| 7,206,720 B2* | 4/2007 | LaPant | B60K 15/06 702/182 |
| 8,538,591 B1* | 9/2013 | Klughart | G01F 23/2962 700/282 |
| 8,984,934 B2* | 3/2015 | Sweppy | G01F 22/00 73/114.54 |
| 9,080,529 B1* | 7/2015 | Klughart | B60R 16/0236 |
| 9,528,872 B2* | 12/2016 | Stevenson | G08B 19/02 |
| 9,576,291 B2* | 2/2017 | Lamb | G06Q 20/405 |
| 9,796,320 B2* | 10/2017 | McGuffin | F02M 37/00 |
| 9,919,664 B2* | 3/2018 | Vucelic | B60R 16/0236 |
| 10,140,785 B1* | 11/2018 | Cox | G01F 9/02 |
| 10,163,141 B2* | 12/2018 | Fansler | G06Q 30/06 |
| 10,900,822 B1* | 1/2021 | Blackmon | G01F 23/268 |
| 2004/0079150 A1* | 4/2004 | Breed | G01F 23/20 73/299 |
| 2005/0192727 A1* | 9/2005 | Shostak | G07C 5/0808 701/1 |
| 2006/0025897 A1* | 2/2006 | Shostak | G06K 19/0717 701/1 |
| 2006/0180371 A1* | 8/2006 | Breed | G07C 5/008 180/197 |
| 2006/0284839 A1* | 12/2006 | Breed | B62D 1/046 345/156 |
| 2009/0056436 A1* | 3/2009 | Miceli | G01F 9/008 73/290 R |
| 2013/0211703 A1* | 8/2013 | Evrard | G01F 1/90 701/123 |
| 2016/0244199 A1* | 8/2016 | Veltrop | F16K 7/068 |
| 2018/0299315 A1* | 10/2018 | Crowne | G01F 22/02 |
| 2019/0376827 A1* | 12/2019 | Gaberthüel | G01F 1/684 |

\* cited by examiner

VEHICLE FUEL TANK MODELING SYSTEMS AND METHODS

FIELD

The present disclosure is generally directed to systems and methods that determine fuel tank models for vehicles that can be used to accurately determine fuel level percentages and/or fuel level volume. Non-linear fuel tank modeling can occur across a plurality of vehicles having a same or similar fuel tank.

BACKGROUND

Generally, vehicles can utilize imprecise means, such as analog gauges, to measure fuel tank volume. While these devices generally provide an operator with a general fuel volume value, these fuel volume values may be imprecise, which can lead to unwanted effects, such as the vehicle running out of fuel unexpectedly. Moreover, even digital calculations of fuel volume may be imprecise.

A lack of ability to accurately determine fuel volume can have implications in commercial arenas as well. Fuel reimbursements (or credits) are one of the largest operating costs for rental vehicle companies. Vehicles are sent out with a full tank of fuel, and rental customers are expected to return the vehicle with the same level of fuel. Today, rental companies lack the tools to objectively measure and track fuel volume, requiring personnel to manually read the fuel gauge and estimate fuel level in the vehicle to make a judgment as to the level of fuel. Under this process, customers may not be charged or are undercharged for fuel use, thus resulting in the rental companies losing revenue. Some customers drive a short distance, which does not register a change on the fuel gauge, and return the vehicle without refueling. Meanwhile, a subsequent renter may incur those incremental fuel charges which may prompt a credit request.

Also, a shape of a fuel tank can vary by manufacturer, vehicle line, and the configuration of the vehicles. This difference may result in a highly non-linear relationship between fuel level percentage and the actual fuel volume. For instance, given a 10 gallon tank, when the fuel level percentage indicates that 50% of fuel level remains, this value does not necessarily mean five gallons remain in the tank. The fuel level could be six gallons or four gallons, for example. These variations can depend on the shape of the fuel tank.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods that provide accurate and real-time fuel volume calculations for vehicles. Some vehicles are configured to determine a fuel level percentage value that is a gross estimate of a current fuel level remaining in a fuel tank of a vehicle. While these fuel level percentage values have some explanatory significance, they generally lack specificity and accuracy. These discrepancies can be due to variations in vehicle equipment, on a per model basis, in some instances. For example, the geometry of a fuel tank in a particular vehicle model may influence how fuel level percentage values compared to a vehicle of the same model, but with a different fuel tank geometry. These differences in vehicle equipment may lead to discrepancies in fuel level percentage value calculation. That is, fuel level percentage value estimator logic implemented in the vehicle may not account for these geometrical differences and may treat these two vehicles identically when calculating fuel level percentage values for each. Moreover, fuel level percentage values may not be a preferred format for some users as users are more accustomed to understanding fuel levels in terms of gallons or liters, which can further be interpreted by the user as an available distance that the vehicle can travel before needing to be refilled. For example, a fuel level percentage value of 15% may generally indicate that the user should refill soon, it is not as informative as knowing that the vehicle has 3.5 gallons of fuel, and that the vehicle has a fuel efficiency of 25 miles per gallon of fuel. Thus, converting the level percentage values to fuel volume values can be advantageous for the end user and more informative than a fuel level percentage value.

A fuel tank model can be created to correlate fuel level percentage values to fuel volume values which account for specific fuel tank geometries. Known amounts of fuel volume can be added to a fuel tank and correlating measurements of fuel level percentage values are determined to establish correlations for a fuel tank. Multiple versions of the same fuel tank can be created by various manufacturers, and each of these variations on the same fuel tank can have differing geometries, which can lead to one or more of these fuel tanks having unique unusable fuel volumes. The systems and methods herein can analyze each fuel tank for unusable fuel volume and adjust any empirical correlated measurements of fuel level percentage values with fuel volume values based on these unusable fuel volume determinations. Some examples include applying an offset for the correlated measurements of the fuel tanks. Another example includes applying a minimum means squared estimator.

Mappings can be created to correlate VIN numbers with fuel tank part numbers, fuel tank part numbers with fuel tank models, and so forth.

Illustrative Embodiments

Figure 1:
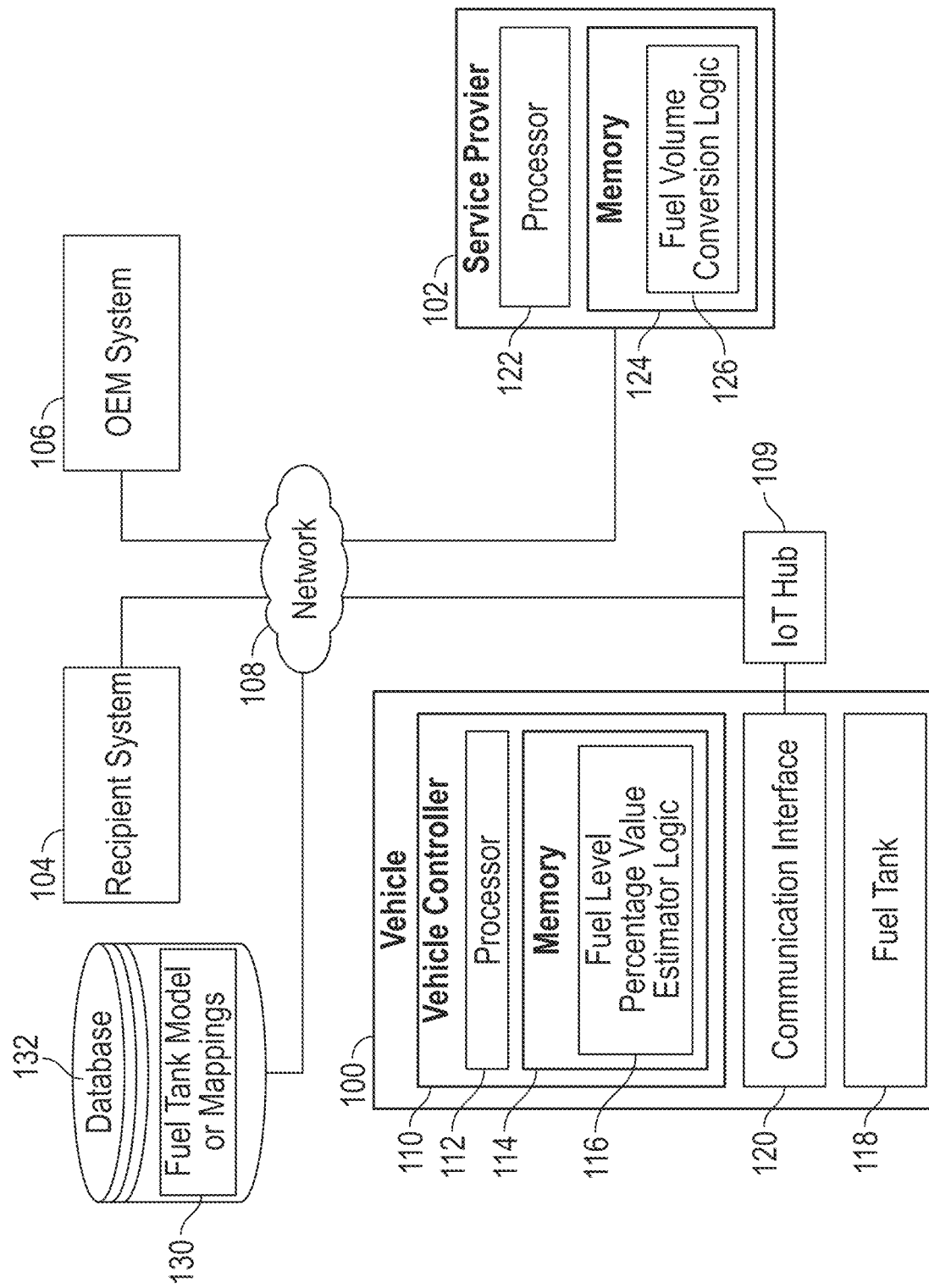
FIG. 1 depicts an illustrative architecture in which techniques and structures for providing the systems and methods disclosed herein may be implemented.

Turning now to the drawings, FIG. 1 depicts an illustrative architecture in which techniques and structures of the present disclosure may be implemented. A vehicle 100, a service provider 102, a recipient system 104, and an OEM (original equipment manufacturer) system 106 can be communicatively coupled through a network 108. The network 108 can include any public or private network such as Wi-Fi, cellular, or other long-range and/or short-range wireless network(s) or protocols. Each component of the architecture is configured to access the network 108 using any means that would be known to one of ordinary skill in the art.

The network 108 can include an IoT (Internet-of-Things) hub 109 that receives data from the vehicle 100 and forwards the data to the service provider 102. The recipient system 104 can query the service provider 102 of a real-time fuel volume value for the vehicle 100 over a secure application programming interface (API).

It will be understood that some aspects of the present disclosure may be performed at the vehicle level, the service provider level, and/or cooperatively vehicle level and the service provider level. In general, the vehicle 100 may have a vehicle controller 110 that can comprise a processor 112 and memory 114. The memory 114 stores instructions, such as implement fuel level percentage value estimator logic 116 that can be executed by the processor 112 to perform aspects of fuel level percentage value estimation. When referring to operations executed by the vehicle controller 110 it will be understood that this includes the execution of instructions by the processor 112. The vehicle controller 110 can utilize the fuel level percentage value estimator logic 116 to calculate a fuel level percentage of a fuel tank 118 in real-time. A fuel level percentage value can be displayed on a human machine interface of the vehicle 100 and/or can be transmitted to the service provider 102 for conversion into a fuel volume value. The vehicle 100 can also comprise a communications interface 120 to access the network 108.

The vehicle controller 110 can transmit a fuel level percentage value and a VIN number of the vehicle 100 to the service provider 102. The service provider 102 can use these values to convert the fuel level percentage value into a fuel volume value and provide the same to the recipient system 104.

In more detail, the service provider 102 can comprise a processor 122 and memory 124. The memory 124 stores instructions, such as implement fuel volume conversion logic 126 that can be executed by the processor 122 to perform aspects of fuel level percentage value to fuel volume conversion. When referring to operations executed by the service provider 102 it will be understood that this includes the execution of instructions by the processor 122. The service provider 102 can be implemented as a physical or virtual server, or as an instance in a cloud environment.

Figure 2:
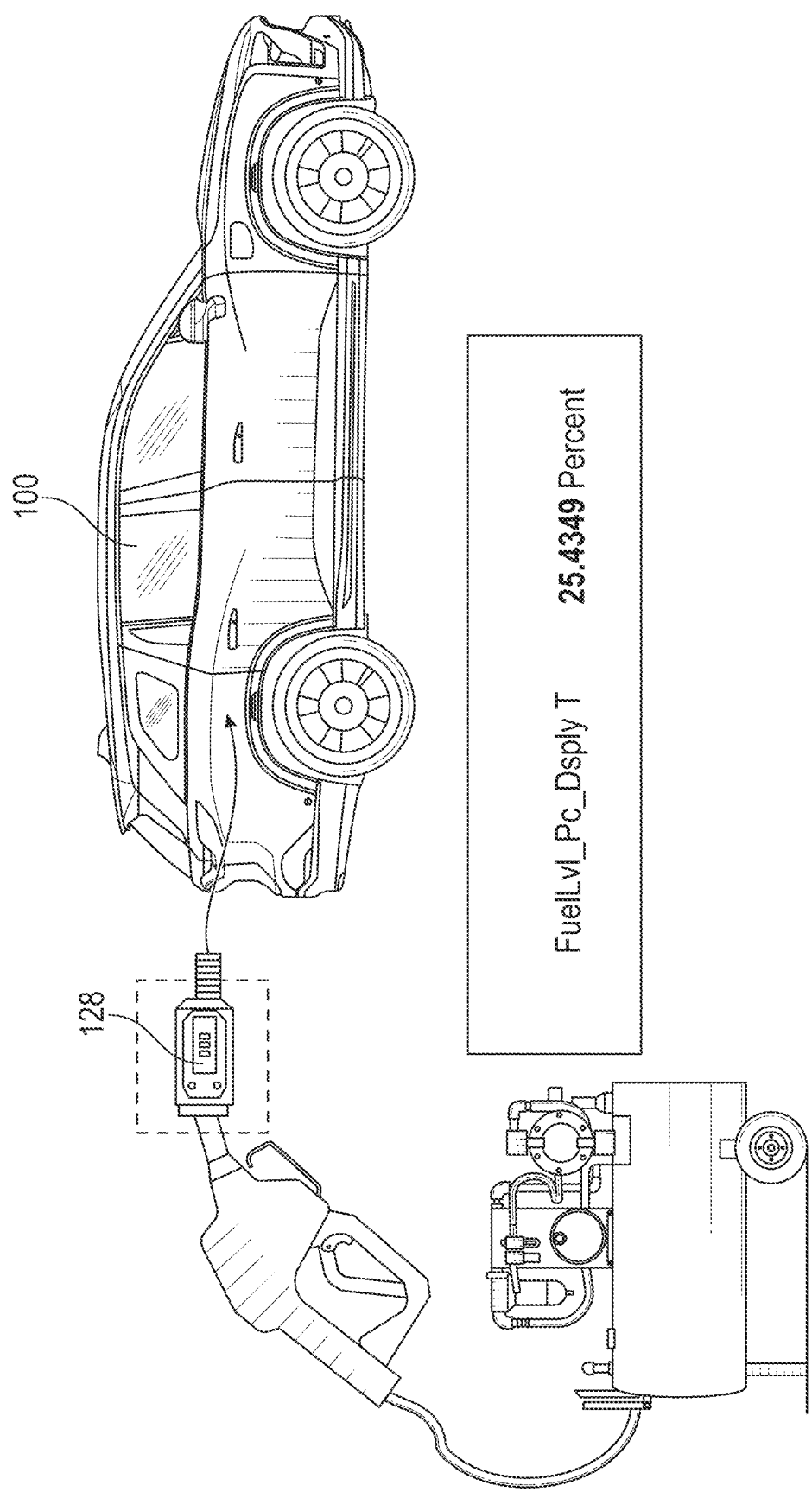
FIG. 2 schematically illustrates a process for creating a fuel tank model of a fuel tank of a vehicle.

Prior to providing fuel level percentage values to fuel volume conversion services, various mappings can be created and maintained by the service provider 102. Some mappings initially rely on fuel tank modeling processes. As noted generally above, fuel tank modeling can include a controlled process, as illustrated in FIG. 2, where a known controlled volume of fuel is introduced into the fuel tank of the vehicle 100. As known volumes of fuel are introduced, a fuel level percentage value is obtained from the vehicle controller 110.

The known volume of fuel can be determined using a filling gauge 128. A mapping or correlation can be created using this process where fuel level percentage values are mapped to fuel volume values. These data are referred to generally as empirical correlated data. This process can use a non-linear model that can capture irregular shapes for each fuel tank application. That is, a specific fuel tank model can be established for each specific fuel tank part number. In some instances, the VIN can be used to obtain specific fuel tank parameters or other fuel system parameters that affect fuel storage of the fuel tank 118.

Figure 3:
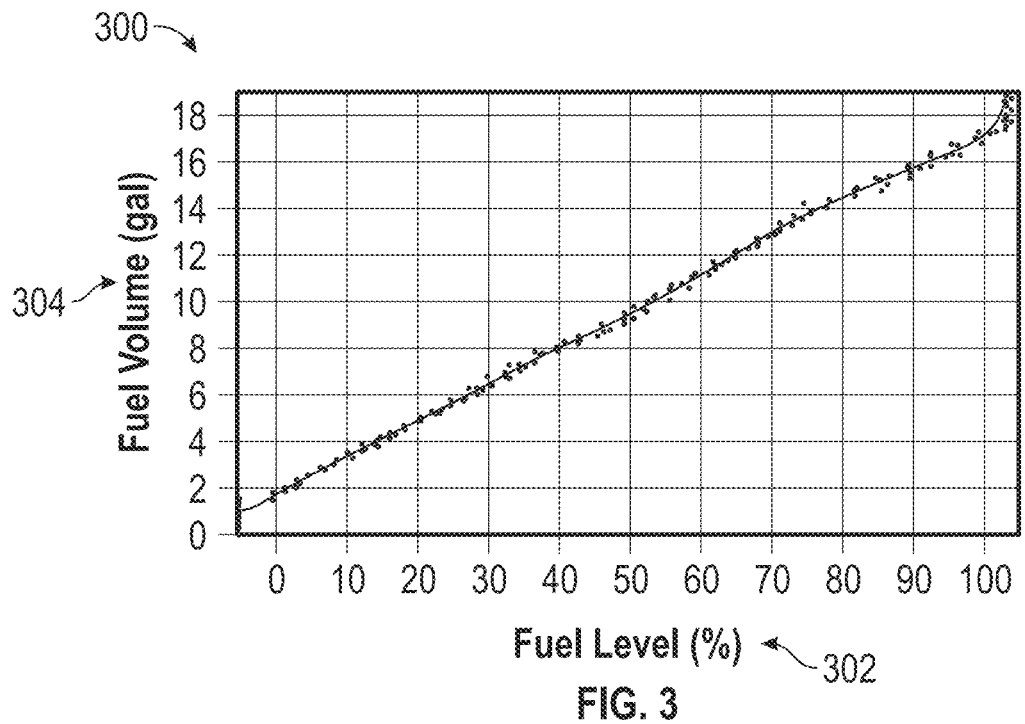
FIG. 3 is a graphical view of a fuel tank model of a fuel tank of a vehicle.

As noted above, each fuel tank can have a unique geometry and the geometry may affect calculations of fuel level percentage values. Empirical modeling of fuel tanks to correlate fuel level percentage values and fuel volume values can be used to reduce errors from this type of geometric variability. An example plot graph 300 is illustrated in FIG. 3, where fuel level percentage values 302 are correlated to fuel volume values 304.

As noted above, unusable fuel volume can affect fuel level percentage values and any subsequent fuel volume correlations. That is, more than one manufacturer may produce the same fuel tank having the same fuel tank part number. Due to geometrical inconsistencies between fuel tanks (even fuel tanks having the same fuel tank part number), the unusable fuel volume of a first fuel tank may be different from that of a second fuel tank, even though these fuel tanks are ostensibly the same. A change in unusable fuel volume may directly affect the fuel level percentage values calculated using the methods disclosed herein.

Figure 4:
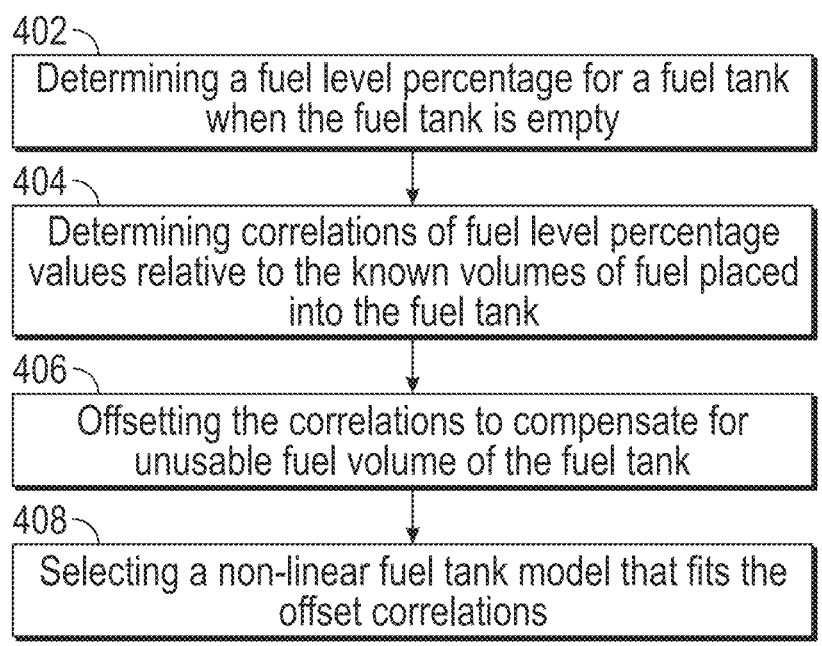
FIG. 4 is a flowchart of an example method of the present disclosure for determining correlations for fuel level percentage values and fuel volume values for a fuel tank that includes quantifying an unusable fuel volume of the fuel tank.

FIG. 4 is a flowchart of an example method of the present disclosure for determining correlations for fuel level percentage values and fuel volume values for a fuel tank that includes quantifying an unusable fuel volume of the fuel tank. The method includes a step 402 of determining a fuel level percentage for a fuel tank when the fuel tank is empty. The fuel tank can be drained or emptied prior to step 402 if necessary. The method can also include a step 404 of determining correlations of fuel level percentage values relative to the known volumes of fuel placed into the fuel tank. As noted herein, this process can include incrementally adding known volumes of fuel into the fuel tank and obtaining measurements fuel level percentage values from, for example, a vehicle controller 110 such as a telematics control unit. The method can include a step 406 of offsetting the correlations to compensate for unusable fuel volume of the fuel tank. As noted above, offsetting can include applying an offset or coefficient to adjust the correlations to compensate for the unusable fuel volume of the fuel tank. Examples of offsetting of correlations are illustrated in FIGS. 5A-5D. The method can include a step 408 of selecting a non-linear fuel tank model that fits the offset correlations. For example, the service provider 102 can iteratively compare a plurality of non-linear fuel tank model candidates against the adjusted correlations and determine a best-performing or best-fitting non-linear fuel tank model candidate. A best performing non-linear model candidate may have a cross-validation error value that is at or below a cross-validation error threshold.

In one use case, a fuel tank can be drained to empty. The fuel level percentage can be measured when the fuel tank is empty. The fuel tank is filled with an amount of fuel. In some instances, this amount of fuel can differ between each test (referred to as "staggered start"). That is, for each empirical test, the first known amount of fuel introduced into a fuel tank could be distinct. For a first vehicle, the first known amount of fuel could be 0.2 gallons. For a second vehicle, the first known amount of fuel could be 0.5 gallons. The known amount entered for each iterative measurement for a vehicle could vary as well. For example, a first known amount could be 0.2 gallons, a second known amount could be 1.3 gallons, a third known amount could be 0.4 gallons, and so forth, until the fuel tank is full and correlated fuel percentage to fuel volume measurements have been obtained.

At each filling event the fuel level percentage is measured. Thus, an iterated filling and recording process can be performed until the fuel tank becomes full. This method can be performed for N different number of vehicles having the same fuel tank. This process can be used to obtain a set of N independent testing results each producing fuel level percentage to fuel volume data pairs.

During a fuel tank filling process, the draining process may not be identical, which depends on the vehicle-to-vehicle configuration (differences in fuel tank geometries or other fuel tank or fuel system parameters). It is thus advantageous to estimate the initial fuel that was left in the fuel tank after each tank has been drained, namely, the unusable fuel volume. By doing so, the effect of the variation due to the unusable fuel left in the tank can be minimized, which can neither be captured by the measurement nor the filling test. An estimation process can be used such that the error caused by differences in unusable fuel volume between the data points is minimized.

While non-linear model analysis can be performed on a per-fuel tank basis, the method of FIG. 4 can be performed for a plurality of fuel tanks that share the same fuel tank part number. An example aggregated fuel tank analysis across a plurality of fuel tanks is illustrated in FIGS. 5A-5D.

Figure 5A:
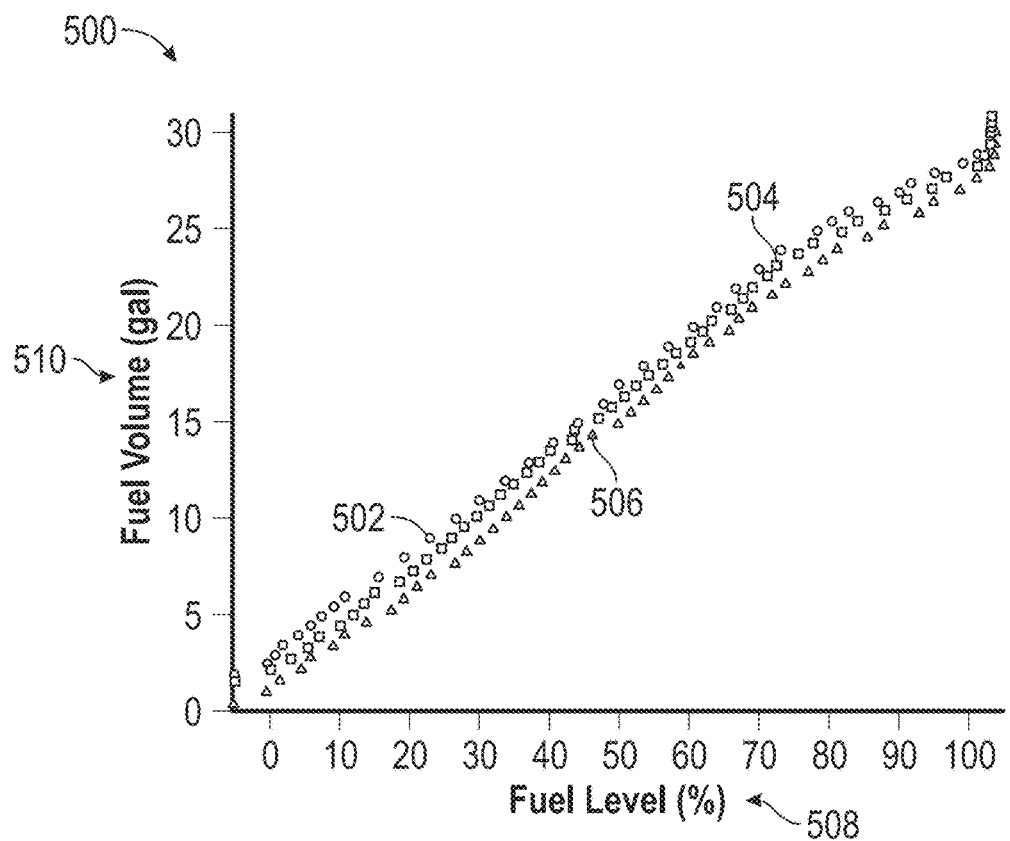
FIGS. 5A-5D collectively and graphically illustrate fuel tank modeling processes.

In FIG. 5A, a plurality of data points are plotted on a graph 500. Data plot line 502 correlates to a first vehicle, whereas data plot line 504 correlates to a second vehicle and data plot line 506 correlates to a third vehicle. Again, the graph 500 plots empirical correlated data of fuel level percentage values on a first axis 508 against fuel volume values on a second axis 510.

Figure 5B:
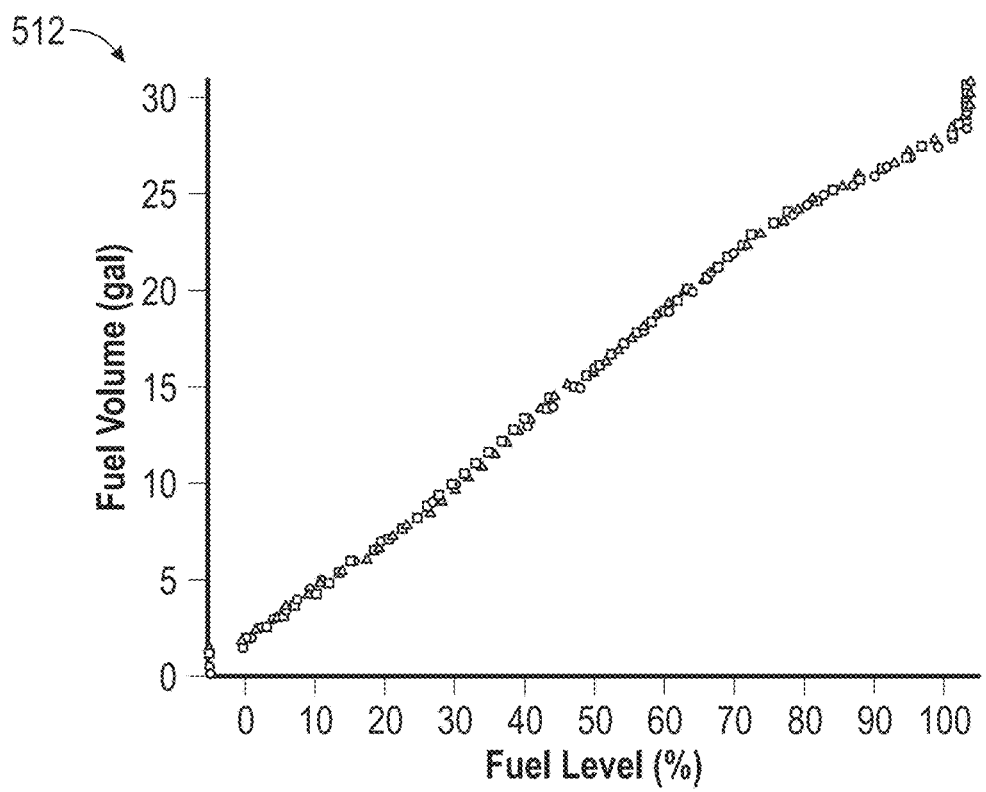

FIG. 5B illustrates post-processed correlations after a mean squared estimator was applied to offset previously calculated usable fuel volumes for the various tests on a graph 512. This mean squared estimator normalizes or smooths differences between the data sets due to the usable fuel volumes.

Figure 5C:
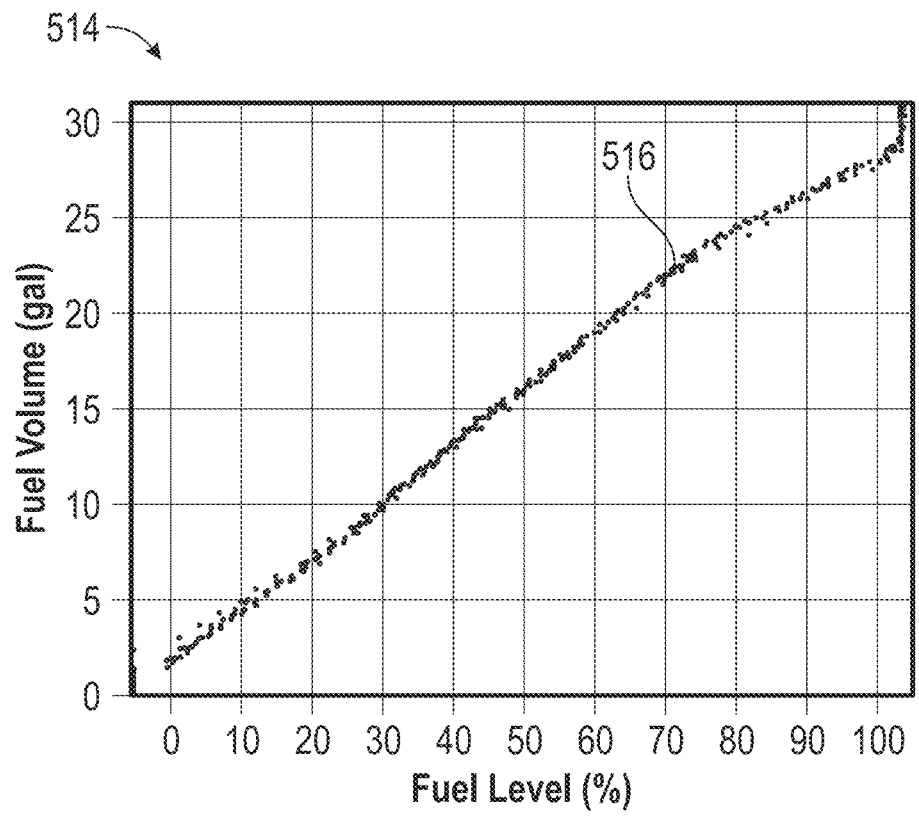
Figure 5D:
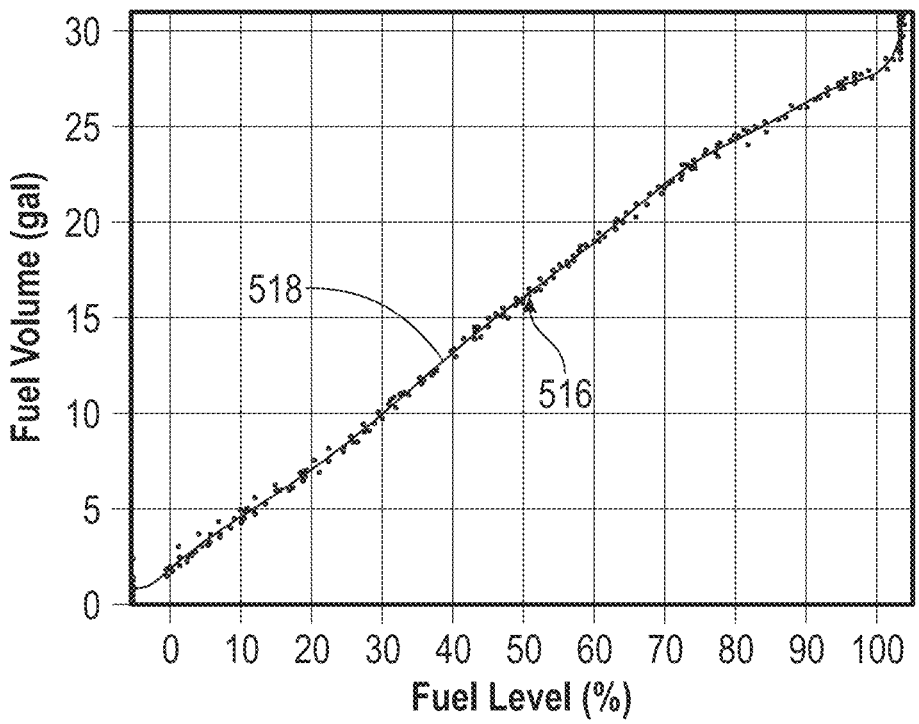

FIG. 5C illustrates the post-processed correlations produced from incremental fuel filing measurements on a graph 514. In this view, the data plot lines of all three vehicles are standardized as dots into a single data plot line 516. In FIG. 5D, a non-linear model 518 is built onto the single data plot line 516. In various instances, the non-linear model is selected based on a candidate selection process. That is, many non-linear model candidates can be compared to the single data plot line 516 and a best-fitting one of the non-linear model candidates is selected. In general, the best-fitting one of the non-linear model candidates is selected as being representative of the group of vehicles. That is, the best-fitting one of the non-linear model candidates matches the post-processed correlations (e.g., offsets applied to empirically determined correlations) of each of the vehicles. This best-fitting model can be correlated to a fuel tank part number, which can further be correlated to a VIN number. When a user desires to obtain fuel volume data on a target vehicle of interest, a VIN number of the vehicle can be used to obtain a fuel tank part number, as disclosed herein. In some instances, the fuel tank part number is known without analyzing the VIN. Based on the fuel tank part number, the best-fitting non-linear model can be retrieved and used to calculate a current fuel level volume estimate for the vehicle.

In some instances, after addition of an offset to each set of correlated data which compensates for the difference in the unusable fuel volume left in the tank, nonlinear regression can be applied to generate a model that is accurate (accurate in the sense the error between the generated model and the data point is small in average) with respect to the empirical correlated data points, nevertheless, unbiased toward any data set, by evaluating the cross-validation error.

This can include an iterative process of choosing different non-linear model candidates and accepting a model that fits against the offset-adjusted correlated data sets with a sufficiently small cross-validation error. By doing so, the generated model is the most accurate representation of the empirical correlated data, but general enough that it is not particularly biased toward any test or data set. In some use cases, evaluating non-linear model candidates can include determining any of a cross-validation error, mean absolute deviation, and a model error tolerance.

As noted above, the service provider 102 can maintain various fuel tank model or mappings 130 in a database 132. The service provider 102 can also maintain VIN to fuel tank part mappings the database 132. As discussed below, the VIN to fuel tank part number mappings can also be obtained from the OEM system 106 (or an equivalent information source).

Again, in an example use case, a particular model of vehicle, such as a Ford™ F-150 may have several levels of equipment options. Not all Ford™ F-150s have the same size or shape of fuel tank. Thus, errors in fuel level percentage values may be introduced when a one-size-fits-all approach is taken. Specific fuel tank part numbers for the fuel tank equipment can be assessed using a vehicle identification number (VIN) for the vehicle 100.

In general, the service provider 102 receives the VIN and fuel level percentage value from the vehicle controller 110. Using the VIN, the service provider 102 queries the OEM system 106 to determine a fuel tank part number that is associated with the vehicle 100 based on the VIN. Once the fuel tank part number has been identified, the service provider 102 obtains a fuel tank model or mapping 130 for the specific fuel tank part number stored in the database 132. Again, the fuel tank model includes specific fuel level percentage value to fuel volume value mappings that are specific to the fuel tank part number (and specific to the geometries of the fuel tank). The service provider 102 uses the fuel tank model or mapping to convert the fuel level percentage value to a fuel volume value. The fuel volume value can be transmitted in a message to the recipient system 104. The fuel volume value could also be displayed to the vehicle operator through a human machine interface. In an example calculation, the fuel level percentage value calculated by the vehicle controller 110 could include 36.765%, which would be converted to a fuel volume of 5.00 gallons by the service provider 102, as identified in the selected fuel tank model.

Figure 6:
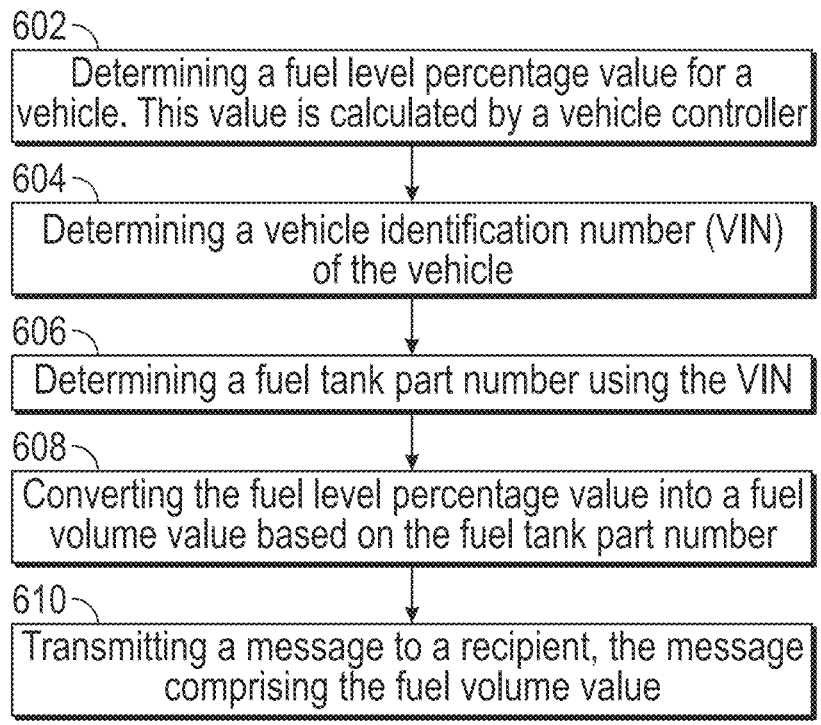
FIG. 6 is a flowchart of an example method of the present disclosure.

FIG. 6 is a flowchart of an example method of the present disclosure. The method includes a step 602 of determining a fuel level percentage value for a vehicle. This value is calculated by a vehicle controller. The fuel level percentage value can be determined from a message transmitted by the vehicle to a service provider. The method includes a step 604 of determining a vehicle identification number (VIN) of the vehicle. The VIN can be transmitted to the service provided by the vehicle controller. The VIN could also be obtained from the recipient system 104.

Next, the method includes a step 606 of determining a fuel tank part number using the VIN. As noted above, this can include interrogating or querying an OEM system for specific vehicle equipment part numbers using the VIN. The method includes a step 608 of converting the fuel level percentage value into a fuel volume value based on the fuel tank part number. In general, this process includes identifying a fuel tank model (in some instances an aggregated or best-performing model) or mapping from the fuel tank part number and utilizing the fuel tank model or mapping in a lookup process. When the fuel volume value is obtained from the fuel tank model or mapping, the method can include a step 610 of transmitting a message to a recipient, the message comprising the fuel volume value.

For example, the recipient could include a vehicle rental service who desires to obtain a fuel volume calculation of a current or real-time fuel volume of a vehicle. Using the above-described method, the vehicle rental service can obtain current or real-time fuel volume of a vehicle from the service provider, which enables the vehicle rental service to make intelligent determinations about vehicle fuel levels and corresponding charges for vehicle renters.

As noted above, this method can include additional steps such as generating a first mapping table that comprises VIN numbers in association with fuel tank part numbers. The method can also include a step of generating a second mapping table that comprises fuel tank part numbers in association with fuel tank models. Each of the fuel tank models comprises correlations of fuel level percentages and fuel volume values.

Figure 7:
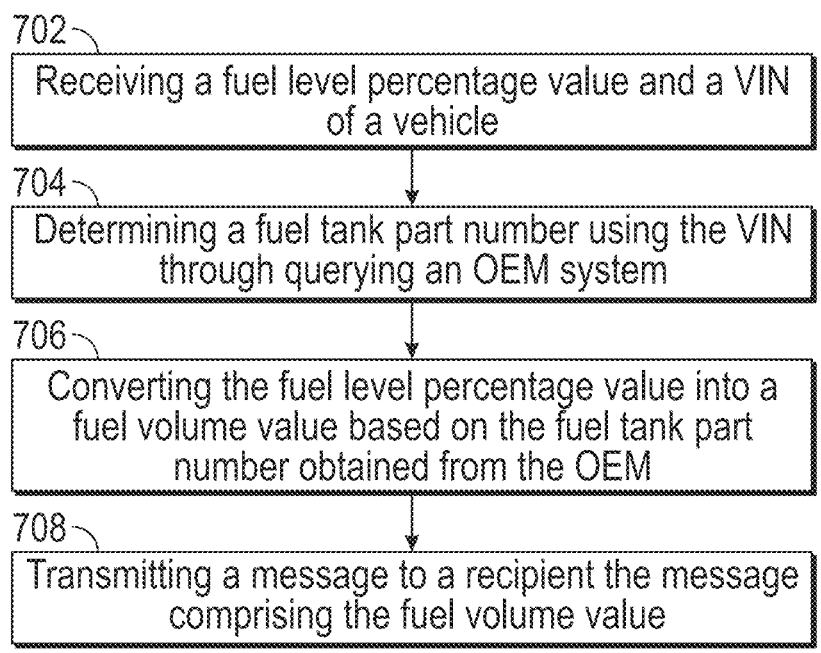
FIG. 7 is a flowchart of another example method of the present disclosure.

FIG. 7 is a flowchart of another example method. The method can include a step 702 of receiving a fuel level percentage value and a VIN of a vehicle. The method can also include a step 704 of determining a fuel tank part number using the VIN through querying an OEM system. The method can further include a step 706 of converting the fuel level percentage value into a fuel volume value based on the fuel tank part number, as well as a step 708 of transmitting a message to a recipient the message comprising the fuel volume value.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   introducing known volumes of fuel into a fuel tank of a first vehicle, wherein the fuel tank of the first vehicle comprises a fuel tank part number;
   determining correlations of fuel level percentage values relative to the known volumes of fuel placed into the fuel tank of the first vehicle;
   offsetting the correlations to compensate for unusable fuel volume of the fuel tank of the first vehicle;
   selecting a non-linear fuel tank model that fits the offset correlations; and
   applying the non-linear fuel tank model to a fuel tank comprising the fuel tank part number of a target vehicle,
   wherein generating the fuel tank model comprises determining an estimate of unusable fuel volume left in the fuel tank, the offsetting of the correlations being based on the unusable fuel volume.

2. The method according to claim 1, further comprising:
   receiving a request to determine a fuel level volume for the target vehicle, the request comprising a fuel level percentage value of the target vehicle; and
   converting the fuel level percentage value into the fuel level volume using the non-linear fuel tank model.

3. The method according to claim 2, further comprising:
   determining a vehicle identification number (VIN) for the target vehicle included in the request;
   determining a fuel tank part number of the target vehicle based on the VIN; and
   selecting the non-linear fuel tank model using the fuel tank part number.

4. The method according to claim 1, wherein selecting the non-linear fuel tank model comprises:
   determining non-linear model candidates for the fuel tank;
   performing non-linear regression analysis on the fuel level percentage values and the known volumes of fuel using the non-linear model candidates; and
   evaluating the non-linear model candidates by determining at least one of a cross-validation error, mean absolute deviation, and/or a model error tolerance.

5. The method according to claim 1, further comprising:
   draining the fuel tank to empty;
   determining, based on the fuel tank being empty, a fuel level percentage value of the fuel level percentage values; and
   wherein the known volumes of fuel vary in amount.

6. A method, comprising:
   emptying a fuel tank of a vehicle;
   determining a fuel level percentage value for the fuel tank when the fuel tank is empty to determine an offset;
   incrementally filling the fuel tank with known volumes of fuel until the fuel tank is full;
   determining correlations between fuel level percentage values and the known volumes of fuel;
   applying the offset to the correlations;
   selecting a non-linear model for the correlations;
   determining a plurality of fuel tank models for a plurality of vehicles that comprise a similar or identical fuel tank to the fuel tank;
   selecting a non-linear model candidate for the fuel tank;
   performing non-linear regression analysis on the fuel level percentage values and the known volumes of fuel using the non-linear model candidate; and
   evaluating the non-linear model candidate by determining at least one of a cross-validation error, mean absolute deviation, and/or a model error tolerance.

7. The method according to claim 6, further comprising:
evaluating a plurality of non-linear model candidates that include the non-linear model candidate; and
determining a best-performing one of the plurality of non-linear model candidates, the best performing one of the plurality of non-linear model candidates having a cross-validation error value that is at or below a cross-validation error threshold, the best-performing one of the plurality of non-linear model candidates being the non-linear model.

8. The method according to claim 6, further comprising determining an estimate of unusable fuel volume left in the fuel tank.

9. The method according to claim 6, wherein an amount of each of the known volumes of fuel is varied.

10. A system, comprising:
a processor; and
a memory for storing instructions, the processor executing the instructions to:
determining an estimate of unusable fuel volume left in a fuel tank of a first vehicle when the fuel tank is empty;
incrementally filling the fuel tank with known volumes of fuel;
determining correlations between fuel level percentage values and the known volumes of fuel;
applying an offset to the fuel level percentage values to compensate for the estimate of the unusable fuel volume;
determining a best-performing non-linear model candidate from a plurality of non-linear model candidates that matches the correlations between the fuel level percentage values and the known volumes of fuel; and
determining a fuel level volume for a second vehicle having a similar or same fuel tank using the best-performing non-linear model candidate.

11. The system according to claim 10, wherein the processor is configured to:
receive a request to determine a fuel level volume for second vehicle, the request comprising a fuel level percentage value of the second vehicle; and
convert the fuel level percentage value into the fuel level volume using a non-linear fuel tank model.

12. The system according to claim 11, wherein the processor is configured to:
determine a vehicle identification number (VIN) for the second vehicle included in the request;
determine a fuel tank part number of the second vehicle based on the VIN; and
select the non-linear fuel tank model using the fuel tank part number.

13. The system according to claim 10, wherein the processor is configured to generate the fuel tank model by determining an estimate of unusable fuel volume left in the fuel tank, the offsetting of the correlations being based on the unusable fuel volume.

14. The system according to claim 10, wherein the processor is configured to select a non-linear fuel tank model by:
determining non-linear model candidates for the fuel tank;
performing non-linear regression analysis on the fuel level percentage values and the known volumes of fuel using the non-linear model candidates;
evaluating the non-linear model candidates by determining at least one of a cross-validation error, mean absolute deviation, and/or a model error tolerance.

15. The system according to claim 10, wherein the processor is configured to:
cause the fuel tank to drain to empty; and
determine, when the fuel tank is empty, a fuel level percentage value of the fuel level percentage values.

16. The system according to claim 10, wherein the known volumes of fuel vary in amount.

17. The system according to claim 10, wherein the processor is configured to stream the fuel level volume for the second vehicle to a recipient system.

18. A method, comprising:
introducing known volumes of fuel into a fuel tank of a first vehicle, wherein the fuel tank of the first vehicle comprises a fuel tank part number;
determining correlations of fuel level percentage values relative to the known volumes of fuel placed into the fuel tank of the first vehicle;
offsetting the correlations to compensate for unusable fuel volume of the fuel tank of the first vehicle;
selecting a non-linear fuel tank model that fits the offset correlations; and
applying the non-linear fuel tank model to a fuel tank comprising the fuel tank part number of a target vehicle,
wherein selecting the non-linear fuel tank model comprises:
determining non-linear model candidates for the fuel tank;
performing non-linear regression analysis on the fuel level percentage values and the known volumes of fuel using the non-linear model candidates; and
evaluating the non-linear model candidates by determining at least one of a cross-validation error, mean absolute deviation, and/or a model error tolerance.

19. A method, comprising:
introducing known volumes of fuel into a fuel tank of a first vehicle, wherein the fuel tank of the first vehicle comprises a fuel tank part number;
determining correlations of fuel level percentage values relative to the known volumes of fuel placed into the fuel tank of the first vehicle;
offsetting the correlations to compensate for unusable fuel volume of the fuel tank of the first vehicle;
selecting a non-linear fuel tank model that fits the offset correlations;
applying the non-linear fuel tank model to a fuel tank comprising the fuel tank part number of a target vehicle,
draining the fuel tank to empty;
determining, based on the fuel tank being empty, a fuel level percentage value of the fuel level percentage values; and
wherein the known volumes of fuel vary in amount.

20. A method, comprising:
emptying a fuel tank of a vehicle;
determining a fuel level percentage value for the fuel tank when the fuel tank is empty to determine an offset;
incrementally filling the fuel tank with known volumes of fuel until the fuel tank is full;
determining correlations between fuel level percentage values and the known volumes of fuel;
applying the offset to the correlations; and
selecting a non-linear model for the correlations,
wherein an amount of each of the known volumes of fuel is varied.

* * * * *